(12) United States Patent
Deshpande

(10) Patent No.: US 12,244,435 B2
(45) Date of Patent: *Mar. 4, 2025

(54) POLICY CONTROL FUNCTION FALLBACK

(71) Applicant: T-Mobile USA, Inc., Bellevue, WA (US)

(72) Inventor: Mallika Deshpande, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/517,440

(22) Filed: Nov. 22, 2023

(65) Prior Publication Data

US 2024/0097933 A1   Mar. 21, 2024

Related U.S. Application Data

(63) Continuation of application No. 17/026,120, filed on Sep. 18, 2020, now Pat. No. 11,870,601.

(51) Int. Cl.
*H04L 12/28* (2006.01)
*H04L 12/14* (2024.01)
(Continued)

(52) U.S. Cl.
CPC ...... *H04L 12/2876* (2013.01); *H04L 12/1407* (2013.01); *H04L 41/0663* (2013.01);
(Continued)

(58) Field of Classification Search
CPC ....... H04L 12/14–1407; H04L 12/2876; H04L 41/0654–0668; H04L 65/1066–1069;
(Continued)

(56) References Cited

U.S. PATENT DOCUMENTS 11,026,080 B2   6/2021   Wu et al.
11,057,341 B2   7/2021   Mirza et al.
(Continued)

FOREIGN PATENT DOCUMENTS

EP   3598799 A1   1/2020

OTHER PUBLICATIONS

3GPP, "Policy and Charging Control Framework for the 5G System; Stage 2: TS 23.503", (Jul. 2020), 120 pgs.
3GPP, "Technical Specification Group Core Network and Terminals; Study on PCRF failure and restoration" (Release 10), vol. CTWG3, No. V10.0.0, Sep. 1, 2010, pp. 1-63.
(Continued)

*Primary Examiner* — Brendan Y Higa
(74) *Attorney, Agent, or Firm* — Lee & Hayes, P.C.

(57) ABSTRACT

Systems, methods, and devices can be utilized for policy control function (PCF) fallback during the set up of a session utilizing a 5th Generation (5G) core network. An example method includes receiving, from a session management function (SMF), a request for a policy corresponding to a session. The request includes a first policy identifier corresponding to a first policy control function (PCF). The example method further includes determining that the first PCF is unavailable, generating a modified request by replacing the first policy identifier with a second policy identifier in the request. The second policy identifier corresponds to a second PCF. The example method also includes transmitting, to the second PCF, the modified second request.

17 Claims, 6 Drawing Sheets

(51) Int. Cl.
*H04L 41/0663* (2022.01)
*H04L 65/1069* (2022.01)
*H04L 69/40* (2022.01)
*H04W 8/08* (2009.01)
*H04W 8/18* (2009.01)
*H04W 28/08* (2023.01)
*H04W 72/53* (2023.01)
*G06F 11/20* (2006.01)

(52) U.S. Cl.
CPC .......... *H04L 65/1069* (2013.01); *H04W 8/08* (2013.01); *H04W 8/18* (2013.01); *H04W 28/0925* (2020.05); *H04W 72/53* (2023.01); *G06F 11/2023* (2013.01); *H04L 69/40* (2013.01)

(58) Field of Classification Search
CPC ............ H04L 69/40; H04W 8/18–205; H04W 76/18–19
See application file for complete search history.

(56) References Cited

U.S. PATENT DOCUMENTS

| | | | |
|---|---|---|---|
| 11,102,058 B1* | 8/2021 | Hua | H04L 41/0668 |
| 2008/0232376 A1 | 9/2008 | Huang et al. | |
| 2013/0339783 A1 | 12/2013 | Fernandez Alonso et al. | |
| 2018/0241615 A1 | 8/2018 | Livanos et al. | |
| 2019/0306324 A1 | 10/2019 | Al-Mehdar et al. | |
| 2020/0100309 A1 | 3/2020 | Jha et al. | |
| 2020/0136911 A1 | 4/2020 | Assali et al. | |
| 2020/0358830 A1 | 11/2020 | Saghir et al. | |
| 2020/0358909 A1 | 11/2020 | Ahmadi et al. | |
| 2022/0094566 A1 | 3/2022 | Deshpande | |
| 2022/0191758 A1 | 6/2022 | Sridharan | |
| 2022/0377510 A1 | 11/2022 | Hamid et al. | |
| 2022/0377529 A1* | 11/2022 | Kim | H04W 8/08 |

OTHER PUBLICATIONS

Extended European Search Report mailed Feb. 7, 2022, for European Patent Application No. 21196116.4, 10 pages.

* cited by examiner

POLICY DATASTORE
400

TABLE 402

| Subscription Permanent Identifier (SUPI) 404 | Data Network Name (DNN) 406 | Protocol Data Unit (PDU) Session Identifier 408 | Main Policy Identifier 410 | Backup Policy Identifier 412 |
|---|---|---|---|---|
| First SUPI | First DNN | First PDU Session Identifier | First Main Policy Identifier | First Backup Policy Identifier |
| Second SUPI | Second DNN | Second PDU Session Identifier | Second Main Policy Identifier | Second Backup Policy Identifier |
| . | . | . | . | . |
| . | . | . | . | . |
| . | . | . | . | . |
| nth SUPI | nth DNN | nth PDU Session Identifier | nth Main Policy Identifier | nth Backup Policy Identifier |

FIG. 4

POLICY CONTROL FUNCTION FALLBACK

CROSS REFERENCE TO RELATED APPLICATIONS

This application is a continuation of and claims priority to commonly assigned, co-pending U.S. application Ser. No. 17/026,120, filed Sep. 18, 2020. Application Ser. No. 17/026,120 is fully incorporated herein by reference.

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures.

FIG. 4 illustrates an example of a policy datastore that tracks different policies established by different PCFs for common sessions.

DETAILED DESCRIPTION

Figure 1:
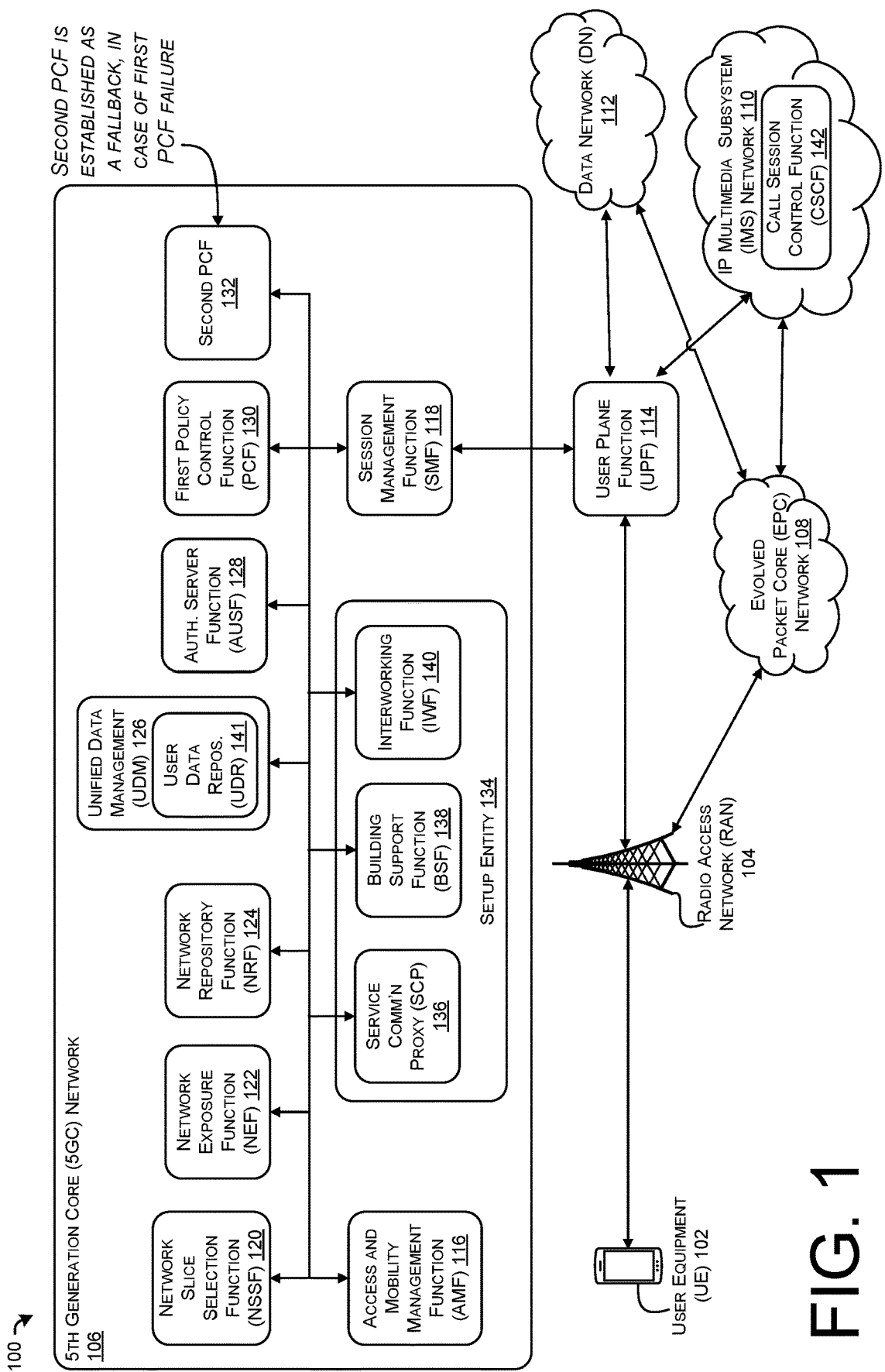
FIG. 1 illustrates an example environment for policy control function (PCF) fallback.

The systems, devices, and techniques described herein relate to policy control function (PCF) fallback with sessions associated with a 5G core (5GC) network. In various examples described herein, multiple PCFs generate policies for a given session, such as a voice call. One of the PCFs serves as a primary PCF for the session. However, when the primary PCF fails or becomes disconnected, then a secondary PCF with a pre-generated policy for the session can assist with setting up the session. Thus, the secondary PCF can improve resiliency of the 5GC network.

In various cases, the primary PCF and the secondary PCF are unable to communicate with one another. For instance, the primary PCF and the secondary PCF may be managed by different entities, have different vendors, or the like. Thus, another entity within the 5GC, herein described as a "setup entity," can manage communication between a session management function (SMF) and the primary PCF as well as between the SMF and the secondary PCF. The setup entity may ensure that both the primary PCF and the secondary PCF generate respective policies for a session by forwarding a policy creation request from the SMF to both the primary PCF and the secondary PCF. In various cases, the setup entity may return a policy creation response from the primary PCF to the SMF and may refrain from returning a policy creation response from the secondary PCF to the SMF. Accordingly, the SMF may be aware of only a single policy associated with the primary PCF that has been generated. The setup entity may store policy identifiers associated with the policies created by the primary PCF and the secondary PCF. Thus, the setup entity may track which policy identifiers and which PCFs are associated with the session.

Subsequent to the creation of the policies by the primary PCF and the secondary PCF, the setup entity may receive messages addressed to the primary PCF that are from the SMF and which relate to the session. As long as the primary PCF is functional and accessible, the setup entity may forward the messages to the primary PCF. The setup entity may also copy the messages and forward the copied messages to the secondary PCF, which can ensure that any changes implemented in the policy of the primary PCF are also propagated to the policy of the secondary PCF. The setup entity may also forward messages from the primary PCF to the SMF. However, in some examples, the setup entity may determine that the primary PCF has failed. For example, a database of the primary PCF may have crashed, making it nonfunctional. In some cases, a link between the primary PCF and the setup entity may have failed, which makes the primary PCF inaccessible. In these cases, the setup entity may initiate fallback to the secondary PCF.

In various examples, the setup entity will modify messages from the SMF to address the session policy created by the secondary PCF, rather than the primary PCF. The setup entity can transmit the modified messages to the secondary PCF, which can therefore take over the setup of the session instead of the primary PCF. The setup entity may also modify messages from the secondary PCF to the SMF to reflect the policy created by the primary PCF. Accordingly, the SMF may be unaware that the session is being handled by the secondary PCF.

Various implementations described herein improve the resiliency of 5GC networks. In some previous 5GC networks in which a single PCF was activated for setup of a session, the session would be dropped and/or transferred to a less advanced core network (e.g., an Evolved Packet Core (EPC) network) when the single PCF failed, thereby causing significant a significant degradation of the user experience of that session. In contrast, by activating both a primary PCF and a secondary PCF for a session, various implementations described herein can salvage the setup of the session on the 5GC network even when the primary PCF fails. Furthermore, various examples described herein provide this resiliency without impacting existing functionality of the SMF or the PCFs. Examples described within this disclosure can provide improved resiliency of the 5GC network based on novel functionality by a single setup entity, rather than coordination by other functions and/or entities within the 5GC network. Thus, implementations described herein can be readily applied to an existing 5GC network.

Various examples of implementations described herein will now be described with reference to the accompanying figures.

FIG. 1 illustrates an example environment 100 for PCF fallback. The environment 100 includes a user equipment (UE) 102, which may be part of a session in the process of setup. As used herein, the terms "session," "protocol data unit (PDU) session," and their equivalents, can refer to data packets carrying a particular type of services (e.g., data services, voice services, or the like) transmitted between at least two endpoints in a network environment. A session can include the transmission of IP data traffic (e.g., data packets), Ethernet traffic, or the like. To enable a session over one or more networks, the session may be set up by various entities within the network. In some cases, the UE 102 may request the session. In some examples, the UE 102 may be a recipient of the session. For example, the UE 102 may initiate a voice call with another UE (not illustrated) or the other UE may call the UE 102. Thus, the UE 102 can be a caller or a recipient of the voice call.

The UE 102 may be any device capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future internet protocol (IP)-based network technology or evolution of an existing IP-based network technology. Examples of the UE 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the UE 102 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

The UE 102 may wirelessly exchange data with a radio access network (RAN) 104. In some instances, the UE 102 and the RAN 104 can exchange data wirelessly using wireless resources specified in the 5G NR standard and/or 4G LTE standard, as defined by 3GPP. In this manner, the RAN 104 can include and/or be substituted for a 3GPP RAN, such a GSM/EDGE RAN (GERAN), a Universal Terrestrial RAN (UTRAN), or an Evolved UTRAN (E-UTRAN), or alternatively, via a "non-3GPP" RAN, such as a Wi-Fi RAN, or another type of wireless local area network (WLAN) that is based on the IEEE 802.11 standards. In some instances, the RAN 104 can include a Wi-Fi Access Point (AP). Although not illustrated, the environment 100 can further include any number and type of base stations representing any number and type of macrocells, microcells, picocells, or femtocells, for example, with any type or amount of overlapping coverage or mutually exclusive coverage compared to the RAN 104. In some cases, the UE 102 may connect to the RAN 104 via an attachment procedure.

In certain implementations, the RAN 104 can transmit and receive communications over frequency resources including "millimeter wave" bands including, but not limited to 26 GHz, 28 GHz, 39 GHz, 60 GHz, and the like. In some embodiments, the RAN 104 can be, or at least include a gNodeB.

In addition, the UE 102 and the RAN 104 may utilize other types of wireless resources. For example, the UE 102 and the RAN 104 may utilize a wireless band including frequency resources in at least one of a Citizens Broadband Radio Service (CBRS) band (e.g., a 3550-3700 MHz band), LTE Band 71 (e.g., a 600 MHz band), LTE Band 48 (e.g., 3500 MHz), and the like. In some instances, the frequency resources can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE Band 50 (1500 MHz), LTE Band 51 (1500 MHz), LTE Band 66 (1700 MHz), LTE Band 70 (2000 MHz), and LTE Band 74 (1500 MHz). Although referred to in the context of LTE bands, it can be understood that the UE 102 and the RAN 104 may utilize the frequency resources discussed herein in the context of any 5G embodiments. In some embodiments, the RAN 104 is part of a Non-Standalone (NSA) architecture and/or a Standalone (SA) architecture. As may be understood, the environment 100 may be implemented in accordance with any one of Option 3, 3a, 3x, 4, 4a, 7, 7a, and/or 7x, as defined by 3GPP.

The RAN 104 may be connected to a 5GC network 106 and an EPC network 108. The RAN 104 may receive data from external devices via the 5GC network 106 and/or the EPC network 108 and transmit the data wirelessly to the UE 102. In various cases, the RAN 104 may receive data from the UE 102 addressed to external devices, the RAN 104 forwards to the 5GC network 106 and/or the EPC network 108, and the 5GC network 106 and/or EPC network 108 forwards the data to the external devices. Further, the 5GC network 106 and the EPC network 108 may be connected to an internet protocol (IP) multimedia subsystem (IMS) network 110 (sometimes referred to as an "IMS core network," an "IMS core," or an "IMS core network subsystem"). IMS is an architectural framework defined by 3GPP for delivering IP multimedia to a device, such as a UE. The IMS network 110 can be maintained and/or operated by one or more service providers, such as one or more wireless carriers ("carriers"), that provide IMS-based services to a user who is associated with the device. For example, a service provider can offer multimedia telephony services that allow a user to call or message other users via the IMS network 110 using their device. A user can also utilize an associated device to receive, provide, or otherwise interact with various different IMS-based services by accessing the IMS network 110. It is to be appreciated that any number of base stations, such as RAN 104, and/or IMS nodes can be associated with the IMS network 110.

An operator of the IMS network 110 can offer any type of IMS-based service, such as, telephony services, emergency services (e.g., Enhanced 911 (E911)), gaming services, instant messaging services, presence services, video conferencing services, social networking and sharing services, location-based services, push-to-talk services, and so on. In order to access these services (e.g., telephony services), a device is configured to request establishment of a communication session. In the case of telephony services, the communication session can comprise a call (e.g., a voice-based communication session, such as a Voice Over LTE (VoLTE) call, a voice over NR (VONR) call, or a Wi-Fi call).

The 5GC network 106 and the EPC network 108 may be further connected to a data network (DN) 112. In general, the DN 112 can include any public or private network(s), such as the Internet. In addition, the DN 112 may include one or more devices that can receive and transmit data. For example, the DN 112 may include any of media server(s), content server(s), other UE(s), user device(s), and the like. In some cases, the DN 112 includes and/or is connected to an entity (e.g., a server) serving as an endpoint in the session with the UE 102.

According to various implementations, the 5GC network 106 may include various entities and/or functions, including a user plane function (UPF) 114, am access and mobility management function (AMF) 116, a session management function (SMF) 118, a network slice selection function (NSSF) 120, a network exposure function (NEF) 122, a network repository function (NRF) 124, unified data management (UDM) 126, and an authentication server function (AUSF) 128. The 5GC network 106 may further include a first policy control function PCF 130 and a second PCF 132. Further, the 5GC network 106 may include a setup entity 134, which may include a service communication proxy (SCP) 136, building support function (BSF) 138, and an interworking function (IWF) 140.

In general, the UPF 114 can be implemented as a network function including functionality to control data transfer between the UE 102 and the various components of the environment 100. In some instances, the UPF 114 can include functionality to act as an anchor point for Radio Access Technology (RAT) handover (e.g., inter and intra), external PDU session point of interconnect to an external network (e.g., the Internet), packet routing and forwarding, packet inspection and user plane portion of policy rule enforcement, traffic usage reporting, traffic routing, Quality of Service (QoS) handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, the UPF 114 may be one or more UPFs, which are associated with the UE 102. Although FIG. 1 illustrates the UPF 114 as being outside of the 5GC network 106, in various examples, the UPF 114 is part of the 5GC network.

In general, the AMF 116 can be implemented as a network function including functionality to provide UE-based authentication, authorization, mobility management, etc., to various UEs. In some instances, the AMF 116 can include functionality to terminate a RAN control plane interface between the UE 102 and other functions. In some instances, the AMF 116 can include functionality to perform registration management of the first UE 102 in the RAN 104 and/or the 5GC network 106, connection management, reachability management, mobility management, access authentication, access authorization, security anchor functionality (e.g., receiving and/or transmitting security keys during registration/authorization), and the like.

In general, the SMF 118 can be implemented as a network function including functionality to manage communication sessions by and between UEs, and/or to provide IP addresses to the UEs. The AMF 116 may update the SMF 118 about a context associated with the UE 102. The SMF 118 may assign an identifier for the UE 102 and/or a communication tunnel used to deliver user plane data to and from the UE 102. For instance, the SMF 118 may assign an IP address to the UE 102. In some cases, the SMF 1118 may select the UPF 114 to facilitate the transmission of user plane data between the UE 102 and the IMS network 110 and/or DN 112.

In general, the NSSF 120 can be implemented as a network function including functionality to select a network slicing instance for a given session involving the UE 102, can work with the AMF 116 to establish an initial PDU session for the UE 102, and can work with the NRF 124 for requesting registration.

In general, the NEF 122 can be implemented as a network function including functionality to securely expose services and/or capabilities provided by and amongst the various network functions, as discussed herein. In some instances, the NEF 122 receives information from other network functions in the 5GC network 106 and can store the received information as structured data using an interface to a data storage network function.

In general, the NRF 124 can be implemented as a network function including functionality to support service discovery (e.g., receive a network function discovery request and provide information associated with the discovered network function instances to a requesting entity). In some instances, the NRF 124 can receive utilization information, capability information, etc. from various network functions, such as the UPF 114, to provide such utilization information to the other components discussed herein. Further, the NRF 124 can select, assign, implement, or otherwise determine network functions to be used in the environment 100.

In general, the UDM 126 can be implemented as a network function including functionality to process authentication credentials, handle user identification processing, manage registration and/or mobility, manage subscriptions between the first UE 102 and a carrier, and/or manage Short Message Service (SMS) data.

In general, the AUSF 128 can be implemented as a network function including functionality to provide authentication to various devices in the environment 100. For example, the AUSF 128 can request device credentials (e.g., security key(s)), verify that the first UE 102 is authorized to connect to a network, and/or control access to the network based on the device credentials.

In general, the first PCF 130 and the second PCF 130 can be implemented as network functions including functionality to support unified policy framework to govern network behavior, provide policy rules to control plane functions and/or enforce such rules, and/or implement a front end to access subscription information relevant for policy decisions in a data repository. In various cases, the first PCF 130 and the second PCF 130 can each generate policies for sessions within the environment 100. As used herein, the term "policy," and its equivalents, can refer to one or more rules associated with a session that relate to QoS, traffic usage reporting, packet routing, packet forwarding, service flow detection, application programming interface (API) values, uplink/downlink (UL/DL) values, flow detection 5G quality indicator (5QI), and the like.

In general, the SCP 136 serves as a common node connecting various network functions within the 5GC network 106. In some cases, the SCP 136 can be associated with one or more locally connected data centers (e.g., edge networks) hosting at least some of the network functions within the 5GC network 106. According to some implementations, the SCP 136 can receive data from the NRF 124 that enables the SCP 136 to route messages between the network functions within the 5GC network 106. For example, the SCP 136 may route messages between the SMF 118 and the first PCF 130 and/or between the SMF 118 and the second PCF 132. The SCP 136 may be located in the same data center environment as the SMF 118, the PCF 130, and/or the PCF 132. In some cases, the PCF 130 can manipulate messages that it routes between network functions.

In general, the BSF 138 is a function that can coordinate multiple PCFs within the 5GC network 106, such as the first PCF 130 and the second PCF 132. In various cases, the BSF 138 may identify which PCF corresponds to a given session, may maintain a list of addresses of PCFs within the 5GC network 106, works with the PCFs to modify (e.g., register, update, and/or delete) the policy that is associated with a particular session, and can provide the address of a PCF associated with a particular session to other network functions, such as to the SMF 118, the NEF 122, and the like.

In general, the IWF 140 is a function that can manipulate message content. In some cases, the IWF 140 coordinates communication between the 5GC network 106 and other networks. For example, the IWF 140 may exchange data between the 5GC network 106 and the EPC network 104. In some cases, the IWF 140 supports Diameter communications between the 5GC network 106 and external diameter servers.

Various functions and/or entities within the 5GC network 106 may exchange user plane data and/or control plane data. As used herein, the term "user plane data" can refer to any uplink or data carrying substantive services that are received and/or transmitted by a UE. The user plane data can include data transmitted between a UE (e.g., the UE 102) and an external network (e.g., the DN 112 and/or the IMS network 110) via a UPF (e.g., the UPF 114), in particular implementations. User plane data can be delivered in the form of one or more data packets. In some cases, user plane data can include at least one of image data, video data, voice data, web browsing data, audio data, or the like.

In contrast, the term "control plane data" can refer to any uplink or downlink data carrying information related to controlling the flow of user plane data through at least one delivery network, such as the environment 100. The control plane data can enable the delivery of services through the environment 100 but may not include the services themselves. In some examples, control plane data can include signaling data exchanged by various components of the environment 100 (e.g., the SMF 118, the first PCF 130, the second PCF 132, and/or the setup entity 134) to establish a user plane data flow through the network by which the services are provided, to control the user plane data flow, and to end the user plane data flow. In particular implementations, the control plane data can include for example, information about session policies managed by the first PCF 130 and/or the second PCF 132, information about a RAN (e.g., the RAN 104) to which a UE (e.g., the UE 102) attaches, subscriber information associated with the UE, a 5G QoS Indicator (5QI) corresponding to requested services through the network, or the like. In various cases, session initiation protocol (SIP) messages can include control plane data.

In certain instances, various components of the EPC network 108, can include, but are not limited to, a mobility management entity (MME), a serving gateway (SGW), a PDN gateway (PGW), a home subscriber server (HSS), an access network discovery and selection function (ANDSF), and/or an evolved packet data gateway (ePDG). An SGW can include a component that handles user-plane data (SGW-U) and a component that handles control-plane data (SGW-C). A PDN can include a component that handles user-plane data (PDN-U) and a component that handles control-plane data (PDN-C). The EPC may further include a policy and charging rules function (PCRF). Each entity, gateway, server, and function in the EPC network 108 can be implemented by specialized hardware (e.g., one or more devices), general hardware executing specialized software (e.g., at least one virtual machine executed on one or more devices), or the like.

In various implementations described herein, functions within the 5GC network 106 may set up a session involving the UE 102. For example, the UE 102 may transmit, to the RAN 104, a request to establish a session with an external device (e.g., a server, another UE, or the like) connected to or included within the IMS network 110 and/or the DN 112. The request, for instance, may be a session establishment request, as defined in 3GPP TS 29.513. The RAN 104 may forward the request to the 5GC network 106 to set up the session. In some examples, an external device may initiate a session with the UE 102 via the 5GC network 106. In particular implementations described herein, the session involving the UE 102 may be a voice call, or some other session including the exchange of guaranteed bit rate (GBR) data between the UE 102 and an external device.

During the set up of the session, the SMF 118 may generate and/or transmit a request to establish as policy associated with the session. For example, the SMF 118 may invoke the NPcf_SMPolicyControl_Create service operation by sending an HTTP POST request. The request may include, for instance, the SUPI, PDU session ID, PDU session type, DNN, S_NSSAI, GPSI, Internal Group Identifier, Access Type, IP address prefix, the user location information, the UE time zone, the serving network, RAT type of the RAN 104, charging information, subscribed session-AMBR, subscribed default 5QI/ARP, or any combination thereof. This request may be received by the setup entity 134 (e.g., the SCP 136).

In various examples, the setup entity 134 may transmit the request to both the first PCF 130 and the second PCF 132. If either one of the first PCF 130 or the second PCF 132 does not include subscription data for the session (e.g., for the SUPI and DNN), then it can request the subscription data from a user data repository (UDR) 141 in the UDM 126. For example, the first PCF 130 and/or the second PCF 132 may invoke the Nudr_DataRepository_Subscribe service operation.

In general, a PCF figures out what a policy needs to be and a corresponding SMF enforces the policy. In various implementations described herein, the first PCF 130 may determine a policy (or multiple policies) for the session and return a response indicating the determined policy and a first identifier associated with the policy (a "first policy identifier"). For instance, the first PCF 130 may make an authorization based on the request from the SMF 118 and a policy for the session, which may be preconfigured on the first PCF 130. The first PCF 130 may create a new resource, which represents the policy and includes the first policy identifier.

Similarly, the second PCF 132 may determine a policy (or multiple policies) for the session and return a response indicating a second identifier associated with the policy (a "second policy identifier"). For example, the second PCF 132 may make an authorization based on the request from the SMF 118 and the policy for the session, which may be preconfigured on the second PCF 132. The second PCF 132 may create a new resource, which represents the policy and includes the second policy identifier. Although examples described herein indicate that each of the first PCF 130 and the second PCF 132 determines a single policy for the session, implementations are not so limited. For example, the first PCF 130 may determine multiple policies associated with the session and with the first session identifier and/or the second PCF 132 may determine multiple policies associated with the session and with the second session identifier.

The setup entity 134 may store (e.g., in the BSF 138) the first identifier and the second identifier associated with the session. The setup entity 134 may forward the response from the first PCF 130 to the SMF 118. The setup entity 134, however, may drop or otherwise refrain from forwarding the response from the second PCF 132 to the SMF 118. Thus, although both the first PCF 130 and the second PCF 132 have determined policies for the session, the SMF 118 may only be aware of the policy determined by the first PCF 130.

The setup entity 134 may ensure that any changes to the policy established by the first PCF 130 are also propagated to the policy established by the second PCF 132. For example, if the UDR 141 transmits a request to change (e.g., modify and/or delete) a policy associated with the session to the setup entity 134, the setup entity 134 will transmit the request to both the first PCF 130 and the second PCF 132. If the SMF 118 transmits a request to change (e.g., modify and/or delete) the policy of the first PCF 130 to the setup entity 134, the setup entity 134 may forward the request to the first PCF 130. In addition, the setup entity 134 may copy the request, modify the copied request to reflect the policy of the second PCF 132 rather than the policy of the first PCF 130, and may transmit the modified request to the second PCF 132. The request may be, for example, an Npcf_PolicyAuthorization_Update message or an Npcf_PolicyAuthorization_Delete message, as defined in 3GPP TS 29.513. Accordingly, the policy established by the second PCF 132 may reflect any changes to the policy established by the first PCF 130.

As the session is being set up by the 5GC network 106, the SMF 118 may transmit and/or receive messages from the first PCF 130 related to the session. These messages may be routed through the setup entity 134. In some examples, however, the setup entity 134 may determine that the first PCF 130 is unreachable and/or nonfunctional. For example, the setup entity 134 may detect that a link between the setup entity 134 and the first PCF 130 has been interrupted or is disconnected. In some instances, the setup entity 134 may determine that the first PCF 130 has failed. For example, one or more servers (e.g., a data center) hosting the first PCF 130 may have lost power or a database hosted by the first PCF 130 may have crashed.

In response to determining that the first PCF 130 is unreachable and/or nonfunctional, the setup entity 134 may initiate fallback to the second PCF 132. The setup entity 134 may receive, from the SMF 118, a request associated with the session that is directed to the first PCF 130. If the session is a VONR session, the request, for instance, may be an Rx message from a call session control function (CSCF) 142 in the IMS network 110. According to some examples, a VONR call is attempted by a subscriber to the network, but if the first PCF 130 is unavailable, the request (e.g., the Rx message associated with the VONR call) from the CSCF 142 cannot be sent to the first PCF 130. In some cases, the request may be an N7 request to change the policy of the session generated by the first PCF 130. For example, the request may be to delete and/or modify the policy. In some examples in which the first PCF 130 is unreachable, the SMF 118 can send an N7 message that requests a change on policy.

Instead of forwarding the request to the unreachable and/or nonfunctional first PCF 130, the setup entity 134 may modify the request to reflect the policy generated by the second PCF 132, rather than the first PCF 130. The setup entity 134 may forward the modified request to the second PCF 132. The second PCF 132 may generate a response based on the modified request and the policy that the second PCF 132 established for the session. Upon receiving the response from the second PCF 132, the setup entity 134 may modify the response to make it appear, to the SMF 118, that the response originated from the first PCF 130. For example, if the response specifies the policy generated by the second PCF 132 for the session, then the setup entity 134 may modify the response to specify the policy generated by the first PCF 130 for the session. The setup entity 134 may return the modified response to the SMF 118. Accordingly, the SMF 118 may proceed to set up the session as though the first PCF 130 was still reachable and/or functional. The SMF 118 may be unaware that the second PCF 132 is involved with the setup of the session.

As a result of various implementations described herein, the session may be established via the 5GC network 106 despite the failure of the first PCF 130. Without the fallback features described herein, various elements within the environment 100 may cause the session setup to fall back to the EPC network 108 in response to being unable to reach the first PCF 130. Thus, various examples described herein can prevent the session from unnecessarily falling back to a potentially older and less-adaptable core network.

Figure 2:
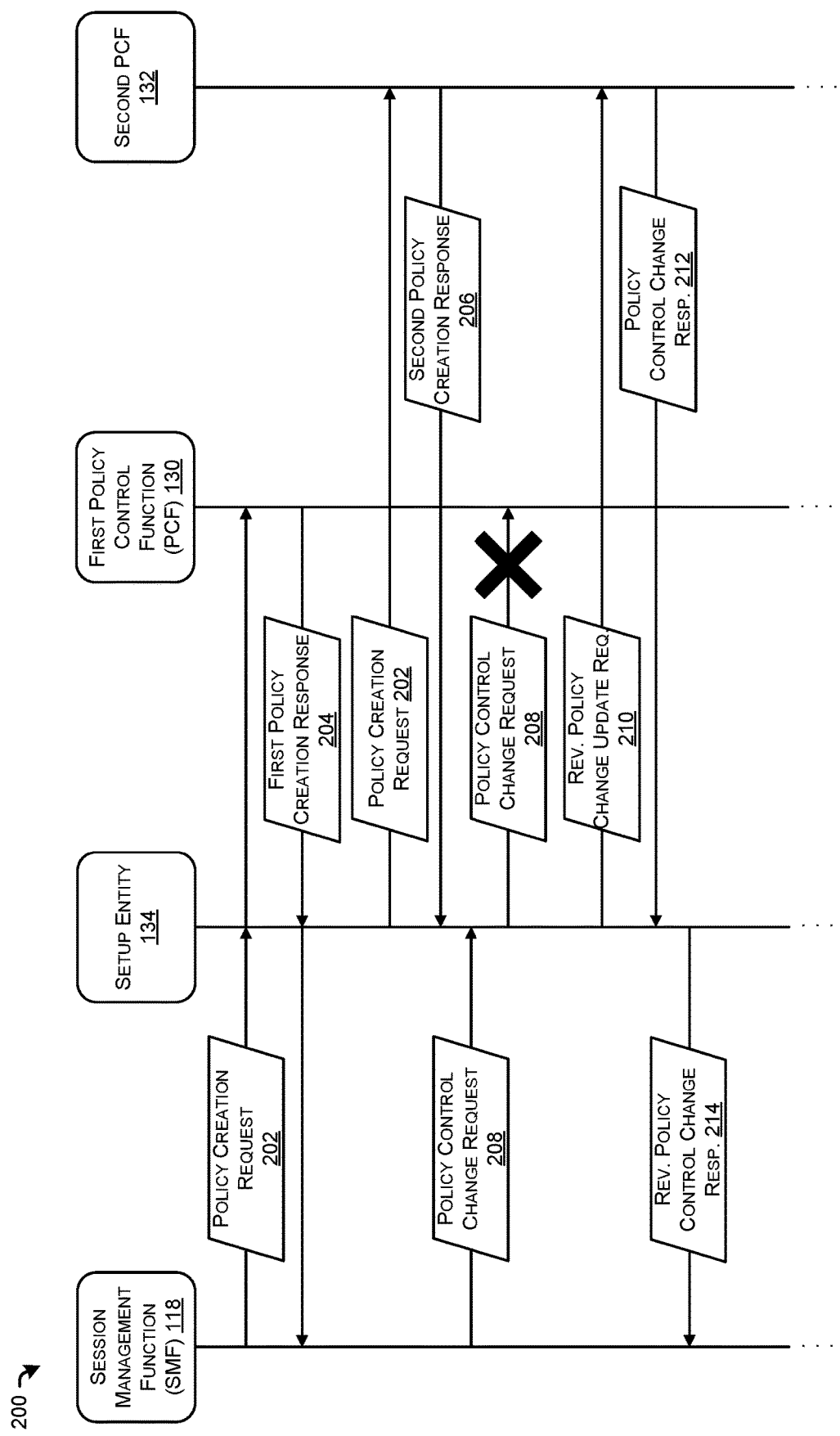
FIG. 2 illustrates example signaling for PCF fallback.

FIG. 2 illustrates example signaling 200 for PCF fallback. As shown, the signaling 200 is between the SMF 118, the setup entity 134, the first PCF 130, and the second PCF 132. For the purposes of FIG. 2, the setup entity 134 may include any combination of the SCP 136, the BSF 138 or the IWF 140 described above with reference to FIG. 1. In various implementations described herein, the messages (e.g., requests and/or responses) in the signaling 200 are SIP messages.

The SMF 118 may transmit a policy creation request 202 to the setup entity 134. The policy creation request 202 may request the creation of a policy associated with a requested session. In some cases, the session is a voice call, a data session, or the like. In some cases, the requested session is for GBR services to be transmitted and/or received by a UE served by a 5GC network including the SMF 118. In various examples, the setup entity 134 and the SMF 118 may be hosted by one or more servers in the same data center. The setup entity 134 may forward the policy creation request 202 to the first PCF 130. The first PCF 130 may be referred to as a "primary PCF" for the session.

In response to receiving the policy creation request 202, the first PCF 130 may determine a policy for the session. In various examples, the first PCF 130 may generate a first policy identifier that corresponds to the policy established by the first PCF 130. The first PCF 130 may transmit a first policy creation response 204 to the setup entity 134, which may forward the first policy creation response 204 to the SMF 118. The first policy creation response 204 may include the first policy identifier and may further indicate the policy determined by the first PCF 130.

In addition, the setup entity 134 may forward the policy creation request 202 to the second PCF 132. The second PCF 132 may be referred to as a "secondary PCF" or a "fallback PCF" for the session. Upon receiving the policy creation request 202, the second PCF 132 may determine the policy for the session. The second PCF 132 may further generate a second policy identifier that corresponds to the policy determined by the second PCF 132. The second PCF 132 may generate and transmit a second policy creation response 206 to the setup entity 134. The second policy creation response 206 may include the second policy identifier and indicate the determined policy. The setup entity 134 may refrain from forwarding the second policy creation response 206 to the SMF 118. Thus, the SMF 118 may be unaware that the second PCF 132 has established a policy for the session.

In various examples, the setup entity 134 may store, in a database, an entry that indicates the session, the first policy identifier in the first policy creation response 204, and the second policy identifier in the second policy creation response 206. For example, the entry may include the subscription permanent identifier (SUPI) associated with the session, a data network name (DNN) associated with the session, a PDU session identifier of the session, the first policy identifier, and the second policy identifier. In some cases, the entry may further store an identifier of the first PCF 130 and an identifier of the second PCF 132. Accordingly, the setup entity 134 may track the first and second policy identifiers, as well as the PCFs, that are associated with the session.

The SMF 118 may transmit a policy control change request 208 to the setup entity 134. In some cases, the policy control change request 208 includes a request to modify and/or delete a policy associated with the session. In some examples, the policy control change request 208 includes an Rx message and/or an N7 message. Because the SMF 118 may be aware that the first PCF 130 has determined policy for the session, the policy control change request 208 may include the first policy identifier.

In various cases, the setup entity 134 may determine that the first PCF 130 is inaccessible and/or nonfunctional. For example, the setup entity 134 may attempt to forward the policy control change request 208 to the first PCF 130. However, the setup entity 134 may determine that the policy control change request 208 has been timed out. For example, the setup entity 134 may not receive a response from the first PCF 130 within a threshold time of transmitting the policy control change request 208. In some cases, the setup entity 134 may detect that the first PCF 130 is inaccessible and/or nonfunctional prior to receiving the policy control change request 208 and may refrain from attempting to transmit the policy control request 208 to the first PCF 130.

The setup entity 134 may generate a revised policy change update request 210 based on the policy change request 208 and may transmit the revised policy change update request to the second PCF 132. In various cases, the setup entity 134 may replace the first policy identifier with the second policy identifier in the policy change request 208, such that the revised policy change update request 210 includes the second policy identifier. The setup entity 134 may refer to the entry that indicates the first policy identifier and the second policy identifier are associated with the same session.

Upon receiving the revised policy change update request 210, the second PCF 132 may update and/or delete the policy associated with the session in accordance with the revised policy change request 210. In acknowledgement of the policy change, the second PCF 132 may generate and transmit a policy control change response 212 to the setup entity 134.

The setup entity 134 may generate a revised policy control change response 214 based on the policy control change response 212. For instance, the policy control change response 212 may include the second policy identifier and indicate the updated policy, and the setup entity 134 may replace the second policy identifier with the first policy identifier, such that the revised policy control change response 214 includes the first policy identifier, rather than the second policy identifier. The setup entity 134 may transmit the revised policy control change response 214 to the session management function 118. Accordingly, the set up of the session may be performed using the second PCF 132, if the first PCF 130 fails.

Figure 3:
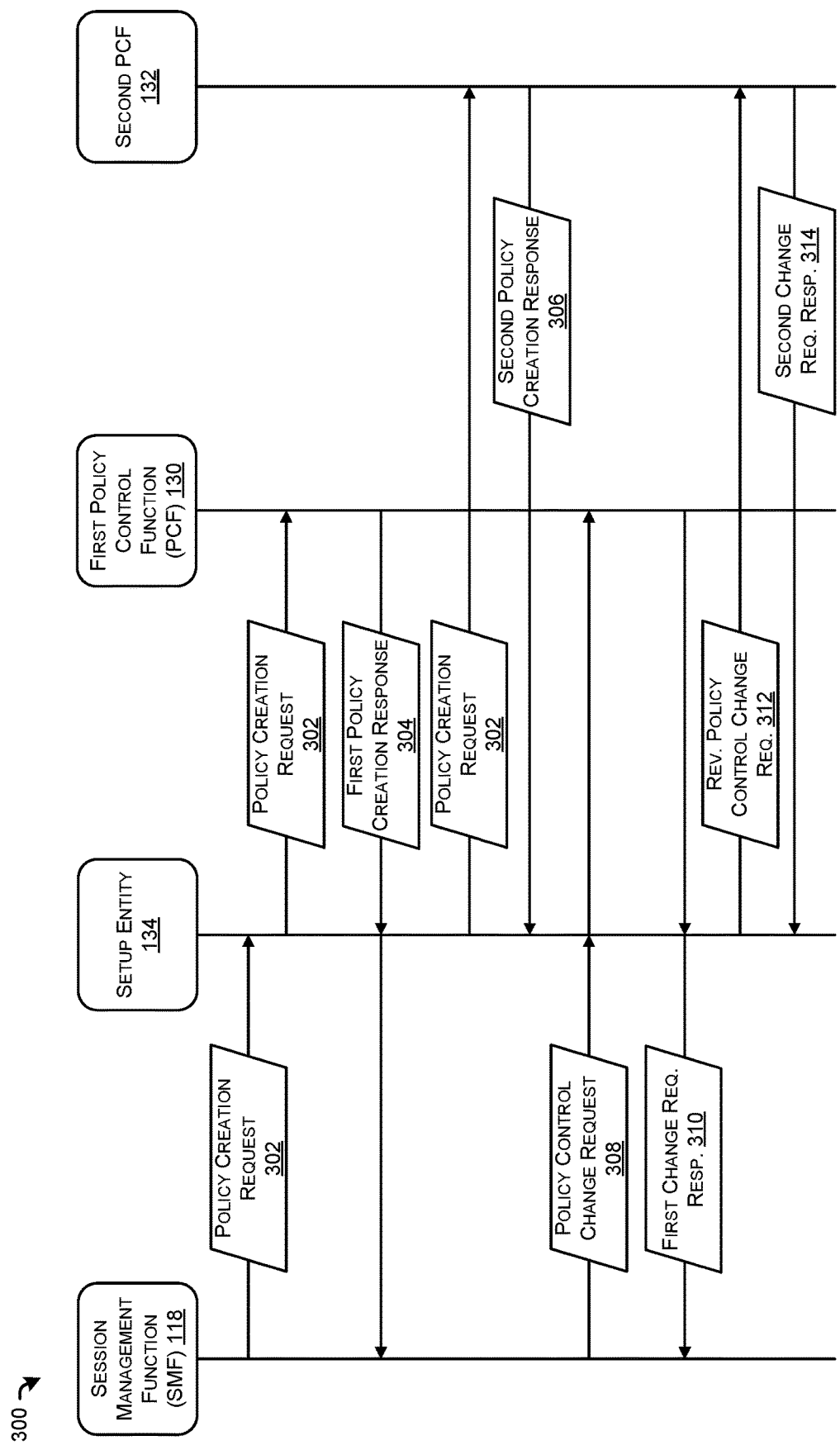
FIG. 3 illustrates example signaling for maintaining multiple policies of a single session, which can facilitate PCF fallback.

FIG. 3 illustrates example signaling 300 for maintaining multiple policies of a single session, which can facilitate PCF fallback. As shown, the signaling 300 is between the SMF 118, the setup entity 134, the first PCF 130, and the second PCF 132. For the purposes of FIG. 3, the setup entity 134 may include any combination of the SCP 136, the BSF 138 or the IWF 140 described above with reference to FIG. 1. In various implementations described herein, the messages (e.g., requests and/or responses) in the signaling 300 are SIP messages.

The SMF 118 may transmit a policy creation request 302 to the setup entity 134. The policy creation request 302 may request the establishment of a policy associated with a requested session. In some cases, the session is a voice call, a data session, or the like. In some cases, the requested session is for GBR services (e.g., voice services) to be transmitted and/or received by a UE served by a 5GC network including the SMF 118. In various examples, the setup entity 134 and the SMF 118 may be hosted by one or more servers in the same data center. The setup entity 134 may forward the policy creation request 302 to the first PCF 130. The first PCF 130 may be referred to as a "primary PCF" for the session.

In response to receiving the policy creation request 302, the first PCF 130 may determine a policy for the session. In various examples, the first PCF 130 may generate a first policy identifier that corresponds to the policy established by the first PCF 130. The first PCF 130 may transmit a first policy creation response 304 to the setup entity 134, which may forward the first policy creation response 304 to the SMF 118. The first policy creation response 304 may include the first policy identifier.

In addition, the setup entity 134 may forward the policy creation request 302 to the second PCF 132. The second PCF 132 may be referred to as a "secondary PCF" or a "fallback PCF" for the session. Upon receiving the policy creation request 302, the second PCF 132 may determine a policy for the session. The second PCF 132 may further generate a second policy identifier that corresponds to the policy established by the second PCF 132. The second PCF 132 may generate and transmit a second policy creation response 306 to the setup entity 134. The second policy creation response 306 may include the second policy identifier and may indicate the policy for the session. The setup entity 134 may refrain from forwarding the second policy creation response 306 to the SMF 118. Thus, the SMF 118 may be unaware that the second PCF 132 has established and/or determined a policy for the session.

In various examples, the setup entity 134 may store, in a database, an entry that indicates the session, the first policy identifier in the first policy creation response 204, and the second policy identifier in the second policy creation response 306. For example, the entry may include the SUPI associated with the session, the DNN identifier associated with the session, a PDU session identifier of the session, the first policy identifier, and the second policy identifier. In some cases, the entry may further store an identifier of the first PCF 130 and an identifier of the second PCF 132. Accordingly, the setup entity 134 may track the first and second policy identifiers, as well as the PCFs, that are associated with the session.

The SMF 118 may transmit a policy control change request 308 to the setup entity 134. In some cases, the policy control change request 308 includes a request to modify and/or delete a policy associated with the session. In some examples, the policy control change request 308 includes an Rx message and/or an N7 message. Because the SMF 118 may be aware that the first PCF 130 has determined the policy for the session, the policy control change request 308 may include the first policy identifier.

In various cases, the setup entity 134 may forward the policy control change request 308 to the first PCF 130. In some cases, the setup entity 134 may confirm that the first PCF 130 is connected to the setup entity 134 and/or is functional prior to transmitting the policy control change request 308 to the first PCF 130. Upon receiving the policy control change request 308, the first PCF 130 may change the policy associated with the session (e.g., the policy associated with the first policy identifier) in accordance with the policy control change request 308. The first PCF 130 may generate and transmit, to the setup entity 134, a first change request response 310 confirming the change. The setup entity 134 may forward the first change request response 310 to the SMF 118.

To ensure that the second PCF 132 can continue to serve as an effective fallback PCF for the first PCF 130, the change to the policy of the first PCF 130 can be propagated to the second PCF 132. In various implementations, the setup entity 134 may generate a revised policy control change request 312 based on the policy control change request 308. For example, the setup entity 134 may replace the first policy identifier in the policy control change request 308 with the second policy identifier, such that the revised policy control change request 312 includes the second policy identifier. The setup entity 134 may transmit the revised policy control change request 312 to the second PCF 132.

Upon receiving the revised policy control change request 312, the second PCF 132 may change the policy associated with the session (e.g., with the second policy identifier) in accordance with the policy control change request 312. To confirm the change to the policy, the second PCF 132 may generate and transmit a second change request response 314 to the setup entity 134. The setup entity 134 may refrain from forwarding the second change request response 314 to the SMF 118. Accordingly, the first PCF 130 and the second PCF 132 may maintain similar policies for the session, thereby enabling the second PCF 132 to serve as an effective fallback PCF if the first PCF 130 fails.

FIG. 4 illustrates an example of a policy datastore 400 that tracks different policies established and/or determined by different PCFs for common sessions. In various examples, the policy datastore 400 may be controlled and/or maintained by a setup entity, such as the setup entity 134 described above with reference to FIG. 1. For example, the policy datastore 400 may be stored in the BSF 138 described above with reference to FIG. 1.

The policy datastore 400 can include a table 402 that has multiple entries. These entries are illustrated in FIG. 4 as rows within the table 402. Each entry can correspond to an individual session. Thus, the policy datastore 400 can be used to track PCFs that have been activated for multiple sessions.

The table 402 includes multiple fields, which are represented in FIG. 4 as columns. The fields include a SUPI field 404, a DNN field 406, a PDU session identifier field 408, a main policy identifier field 410, and a backup policy identifier 412.

The SUPI field 404 may identify the subscriber associated with each session. In some cases, the SUPI field 404 may identify a UE that is an endpoint of the session and/or a user of the UE. Each user and/or UE associated with a 5GC network may have a unique SUPI. For example, the SUPI field 404 of an entry in the table 402 may identify the UE 102 described above with reference to FIG. 1.

The DNN field 406 may identify a data network associated with each session. For example, the DNN field 406 may identify an access point and/or RAN connected to a UE that is an endpoint of the session. In some examples, the DNN field 406 of an entry in the table 402 may identify the RAN 104 described above with reference to FIG. 1.

The PDU session identifier field 408 may identify each session. In various implementations, the PDU session identifier field 408 may uniquely identify each session. For example, the PDU session identifier field 408 may identify a default PDU session for a dedicated data session. In some cases, a UE that is an endpoint of a session may generate a PDU session identifier for the session.

The main policy identifier field 410 may be include an identifier of a policy of each session, wherein the identifier is generated by a main PCF for the session. In various cases, the main policy identifier field 410 may include a string that uniquely identifies a given policy from the perspective of the associated main PCF. In some examples, an entry of the table 402 can include, in the main policy identifier field 410, the first policy identifier generated by the first PCF 130 described above with reference to FIG. 1.

The backup policy identifier field 412 may include another identifier of a policy of each session, wherein the identifier is generated by a backup (or fallback) PCF for the session. In some examples, the backup policy identifier field 412 includes a string that uniquely identifies a given policy from the perspective of the associated backup PCF. For example, an entry of the table 402 can include, in the backup policy identifier field 412, the second policy identifier generated by the second PCF 132 described above with reference to FIG. 1.

Although not illustrated in FIG. 4, in some cases, the table 402 may further include a field indicating the main PCF for each session (e.g., the PCF associated with the main policy identifier field 410) and/or a field indicating the backup PCF for each session (e.g., the PCF associated with the backup policy identifier 412). For example, the table 402 can store an address (e.g., an IP address) of the main PCF and the backup PCF for each session.

Figure 5:
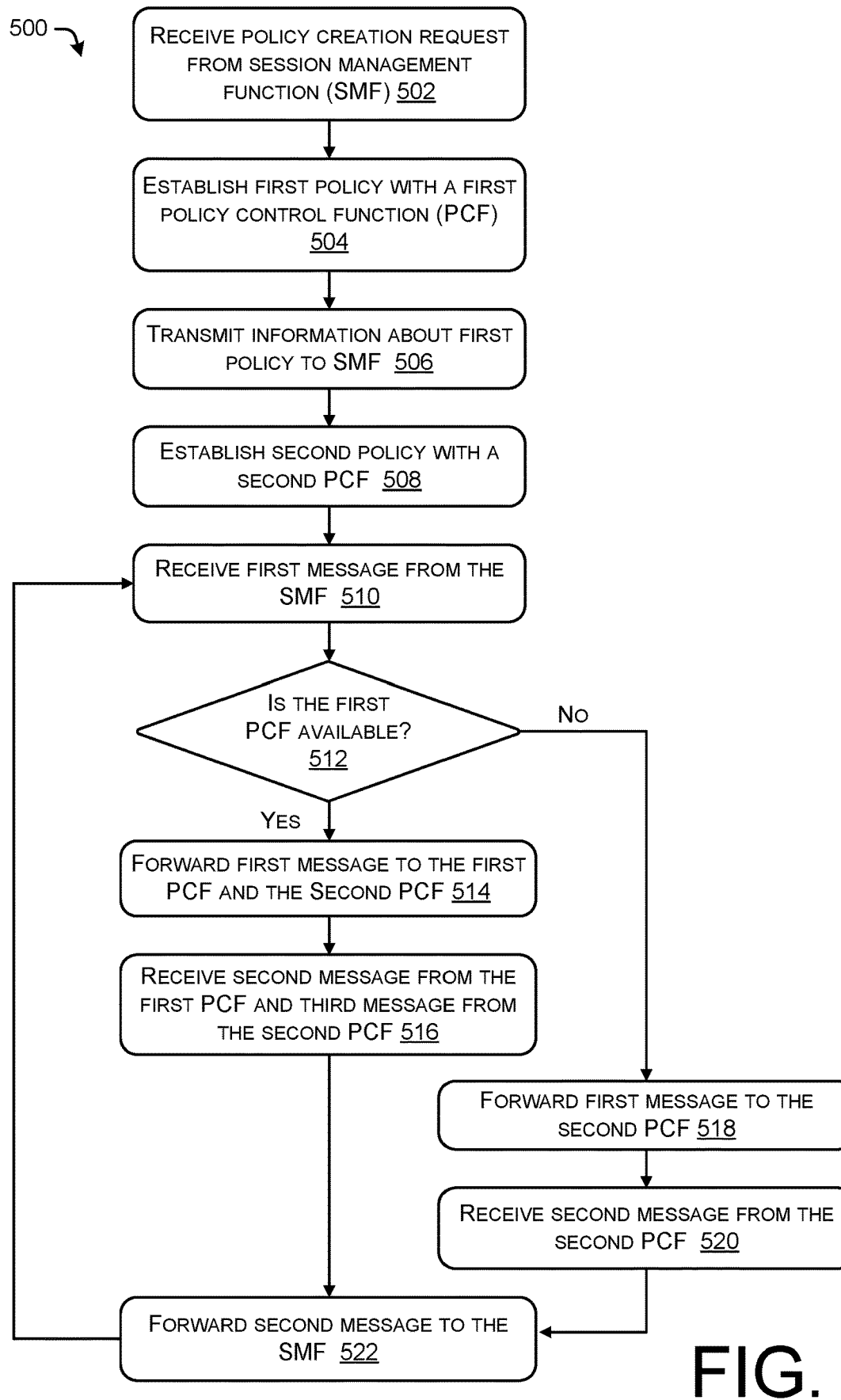
FIG. 5 illustrates an example process for PCF fallback.

FIG. 5 illustrates an example process 500 for PCF fallback. In various implementations, the process 500 can be performed by an entity including one or more of the setup entity 134, the SCP 136, the BSF 138, or the IWF 140 described above with reference to FIG. 1.

At 502, the entity receives a policy creation request from an SMF. The policy creation request may be a SIP request. The policy creation request may request a policy associated with a session (e.g., a voice session, a data session, or the like). In some cases, the session is a VONR session. The policy creation request may be, for instance, an Npcf_SM-PolicyControl_Create message.

At 504, the entity establishes a first policy with a first PCF. According to various implementations, the entity forwards the policy creation request to the first PCF. In response, the first PCF may transmit a response to the entity that indicates a first policy identifier. The response may further indicate the requested policy. The response may be a SIP response.

At 506, the entity transmits information about the first policy to the SMF. In various cases, the entity may forward the response from the first PCF to the SMF.

At 508, the entity establishes a second policy with a second PCF. According to various implementations, the entity forwards the policy creation request to the second PCF. In response, the second PCF may transmit a response to the entity that indicates a second policy identifier. The response may further indicate the requested policy. The response may be a SIP response. In various examples, the entity may refrain from forwarding the response from the second PCF to the SMF.

According to some implementations, the entity stores, in a datastore, an entry corresponding to the session. The entry may include the first policy identifier, which is associated with the first PCF, as well as the second policy identifier, which is associated with the second PCF. The entry may further identify the session that both policy identifiers correspond to. For example, the entry may include a SUPI of the session, a DNN of the session, and a PDU session identifier of the session. In some cases, the entry may further include an identifier (e.g., an IP address) of the first PCF and/or an identifier (e.g., an IP address) of the second PCF.

At 510, the entity receives a first message from the SMF. The first message may be a SIP request. According to various examples, the first message may be a request to change (e.g., update and/or delete) the policy of the session. For example, the first message may be an Npcf_SMPolicy-Control_Update message, an Npcf_SMPolicyControl_UpdateNotify message, or an Npcf_SMPolicyControl_Delete message. The first message may include the first policy identifier or otherwise indicate that the first message is addressed to the first PCF.

At 512, the process 500 includes determining whether the first PCF is available. For example, the entity may transmit a message (e.g., the first message) toward the first PCF and may determine whether greater than a time interval has elapsed without the entity having received a response from the first PCF. This may indicate that the message has been timed out. In some cases, the entity may determine whether a link between the entity and the first PCF has been disconnected. In some instances, the entity may determine whether the first PCF is nonfunctional. For example, the entity may determine whether a database of the first PCF has crashed.

If the first PCF is determined to be available at 512, then the process 500 proceeds to 514. At 514, the entity forwards the first message to the first PCF and to the second PCF. For example, the entity may transmit the first message to the first PCF and may send a copy of the first message to the second PCF. In various examples, the entity may revise the copy of the first message to include the second policy identifier, rather than the first policy identifier, prior to sending the copy of the first message to the second PCF. The second message and the third message may each be based on the change to the policy requested by the first message.

At 516, the entity receives a second message from the first PCF and a third message from the second PCF. The second message may include the first policy identifier. The third message may include the second policy identifier. In some cases, the entity may refrain from forwarding the third message to the SMF.

If, on the other hand, the first PCF is determined to be unavailable at 512, then the process 500 proceeds to 518. At 518, the process includes forwarding the first message to the second PCF. According to various examples, the entity may revise the first message to include the second policy identifier, rather than the first policy identifier.

At 520, the entity receives a second message from the second PCF. The second message may include the second policy identifier. The second message may be based on the change to the policy requested by the first message. In various implementations, the entity modifies the second message received from the second PCF to include the first policy identifier, rather than the second policy identifier.

At 522, the entity forwards the second message to the SMF. According to various implementations, the second message may indicate the change requested by the SMF. The second message may also include the first policy identifier. In various examples, the process 500 returns to 510.

Figure 6:
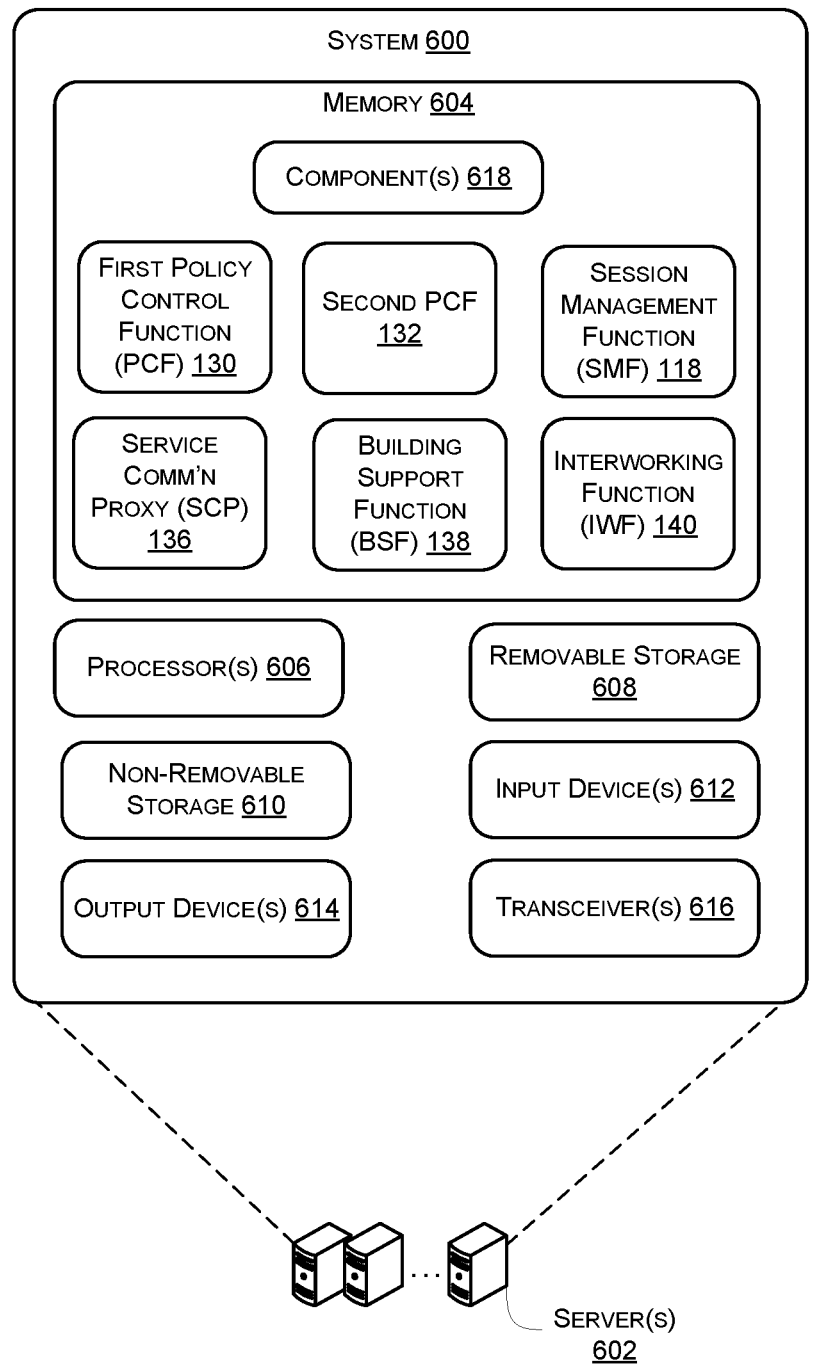
FIG. 6 illustrates an example of a system facilitating PCF fallback.

FIG. 6 illustrates an example of a system 600 facilitating PCF fallback. In various examples, the system 600 can be implemented by one or more servers 602. The system 600 includes any of memory 604, processor(s) 606, removable storage 608, non-removable storage 610, input system(s) 612, output system(s) 614, and transceiver(s) 616. The system 600 may be configured to perform various methods and functions disclosed herein.

The memory 604 may include component(s) 618. The component(s) 618 may include at least one of instruction(s), program(s), database(s), software, operating system(s), etc. In some implementations, the component(s) 618 include instructions that are executed by processor(s) 606 and/or other components of the system 600. In various examples, the memory 604 can store instructions that, when executed by the processor(s) 606, cause the system 600 and/or the processor(s) 606 to perform operations of the SMF 118, the first PCF 130, the second PCF 132, the SCP 136, the BSF 138, the IWF 140, the setup entity 134, or any combination thereof.

In some embodiments, the processor(s) 606 include a central processing unit (CPU), a graphics processing unit (GPU), or both CPU and GPU, or other processing unit or component known in the art.

The system 600 may also include additional data storage systems (removable and/or non-removable) such as, for example, magnetic disks, optical disks, or tape. Such additional storage is illustrated in FIG. 6 by removable storage 608 and non-removable storage 610. Tangible computer-readable media can include volatile and non-volatile, removable and non-removable media implemented in any method or technology for storage of information, such as computer readable instructions, data structures, program modules, or other data. The memory 604, the removable storage 608, and the non-removable storage 610 are all examples of computer-readable storage media. Computer-readable storage media include, but are not limited to, Random Access Memory (RAM), Read-Only Memory (ROM), Electrically Erasable Programmable Read-Only Memory (EEPROM), flash memory, or other memory technology, Compact Disk Read-Only Memory (CD-ROM), Digital Versatile Discs (DVDs), Content-Addressable Memory (CAM), or other optical storage, magnetic cassettes, magnetic tape, magnetic disk storage or other magnetic storage systems, or any other medium which can be used to store the desired information and which can be accessed by the system 600. Any such tangible computer-readable media can be part of the system 600.

The system 600 may be configured to communicate over a telecommunications network using any common wireless and/or wired network access technology. Moreover, the system 600 may be configured to run any compatible system Operating System (OS), including but not limited to, Microsoft Windows Mobile, Google Android, Apple iOS, Linux Mobile, as well as any other common mobile system OS.

The system 600 also can include input system(s) 612, such as a keypad, a cursor control, a touch-sensitive display, voice input system, etc., and output system(s) 614 such as a display, speakers, printers, etc. These systems are well known in the art and need not be discussed at length here.

As illustrated in FIG. 6, the system 600 also includes one or more wired or wireless transceiver(s) 616. For example, the transceiver(s) 616 can include a network interface card (NIC), a network adapter, a Local Area Network (LAN) adapter, or a physical, virtual, or logical address to connect to various network components, for example. To increase throughput when exchanging wireless data, the transceiver(s) 616 can utilize multiple-input/multiple-output (MIMO) technology. The transceiver(s) 616 can include any sort of wireless transceivers capable of engaging in wireless, radio frequency (RF) communication. The transceiver(s) 616 can also include other wireless modems, such as a modem for engaging in Wi-Fi, WiMAX, Bluetooth, infrared communication, and the like. The transceiver(s) 616 may include transmitter(s), receiver(s), or both.

EXAMPLE CLAUSES

A: A system, including: one or more processors; a memory storing components executable by the one or more processors to perform operations including: receiving, from a session management function (SMF), a first SIP request that requests a policy associated with a voice session; transmitting, to a first policy control function (PCF), the first SIP request; receiving, from the first PCF, a first SIP response that includes a first policy identifier corresponding to the policy of the voice session; forwarding, to the SMF, the first SIP response; transmitting, to a second PCF, the first SIP request; receiving, from the second PCF, a second SIP response that includes a second identifier corresponding to the policy of the voice session; receiving, from the SMF, a second SIP request that includes the first policy identifier; determining that a communication link with the first PCF is interrupted; generating a modified second SIP request by replacing the first policy identifier with the second policy identifier in the second SIP request; and transmitting, to the second PCF, the modified second SIP request.

B. The system of clause A, wherein the one or more processors and the memory are included in at least one of a service communication proxy (SCP), a building support function (BSF), or an interworking function (IWF).

C. The system of clause A or B, wherein the second SIP request includes at least one of an Rx message originating from an Internet Protocol (IP) Multimedia Subsystem (IMS) network, a policy control update message, or a policy control delete message.

D. A system, including: one or more processors; a memory storing components executable by the one or more processors to perform operations including: receiving, from a session management function (SMF), a request for a policy corresponding to a session, the request including a first policy identifier corresponding to a first policy control function (PCF); determining that the first PCF is unavailable; generating a modified request by replacing the first policy identifier with a second policy identifier in the request, the second policy identifier corresponding to a second PCF; and transmitting, to the second PCF, the modified second request.

E. The system of clause D, wherein the one or more processors and the memory are included in at least one of a service communication proxy (SCP), a building support function (BSF), or an interworking function (IWF).

F. The system of clause D or E, wherein the second request includes at least one of an Rx message originating from an Internet Protocol (IP) Multimedia Subsystem (IMS) network, a policy control update message, or a policy control delete message.

G. The system of any one of clauses D to F, wherein the memory includes a datastore that includes: an entry including the first policy identifier, the second policy identifier, and an identifier of the session, wherein generating the modified request includes: identifying the entry based on the first policy identifier; and identifying the second policy identifier based on the entry.

H. The system of clause G, wherein the entry further includes a subscription permanent identifier (SUPI) and a data network name (DNN) of the session.

I. The system of any one of clauses D to H, wherein the session includes a voice over new radio (VONR) session.

J. The system of any one of clauses D to I, wherein the operations further include: receiving, from the second PCF, a response based on the modified request, the response including the second policy identifier; generating a modified response by replacing the second policy identifier with the first policy identifier in the response; and transmitting, to the SMF, the modified response.

K. The system of any one of clauses D to J, the request being a first request, the response being a first response, the operations further including: receiving, from the SMF, a second request that requests the policy associated with the session; transmitting, to the first PCF, the second request; receiving, from the first PCF, a second response that includes the first policy identifier; forwarding, to the SMF, the second response; transmitting, to the second PCF, the second request; and receiving, from the second PCF, a third response that includes the second policy identifier.

L. The system of any one of clauses D to K, the request being a first request, the response being a first response, the operations further including: receiving, from the SMF, a second request that requests a change to the policy associated with the session, the second request including the first policy identifier; transmitting, to the first PCF, the second request; receiving, from the first PCF, a second response that includes the first policy identifier; transmitting, to the SMF, the second response; generating a revised second request by replacing the first policy identifier with the second policy identifier in the second request; transmitting, to the second PCF, the revised second request; and receiving, from the second PCF, a third response that includes the second policy identifier.

M. A method, including: receiving, from a session management function (SMF), a request for a policy corresponding to a session, the request including a first policy identifier corresponding to a first policy control function (PCF); determining that the first PCF is unavailable; generating a modified request by replacing the first policy identifier with a second policy identifier in the request, the second policy identifier corresponding to a second PCF; and transmitting, to the second PCF, the modified second request.

N. The method of clause M, wherein the method is performed by at least one of a service communication proxy (SCP), a building support function (BSF), or an interworking function (IWF).

O. The method of clause M or N, wherein generating the modified request includes: identifying, in a datastore, an entry including the first policy identifier, the second policy identifier, and an identifier of the session; and identifying the second policy identifier based on the entry.

P. The method of clause O, wherein the entry further includes a subscription permanent identifier (SUPI) and a data network name (DNN) of the session.

Q. The method of any one of clauses M to P, wherein the session includes a voice over new radio (VONR) session.

R. The method of any one of clauses M to Q, further including: receiving, from the second PCF, a response based on the modified request, the response including the second policy identifier; generating a modified response by replacing the second policy identifier with the first policy identifier in the response; and transmitting, to the SMF, the modified response.

S. The method of any one of clauses M to R, the request being a first request, the response being a first response, the method further including: receiving, from the SMF, a second request that requests the policy associated with the session; transmitting, to the first PCF, the second request; receiving, from the first PCF, a second response that includes the first policy identifier; forwarding, to the SMF, the second response; transmitting, to the second PCF, the second request; and receiving, from the second PCF, a third response that includes the second policy identifier.

T. The method of any one of clauses M to S, the request being a first request, the response being a first response, the method further including: receiving, from the SMF, a second request that requests a change to the policy associated with the session, the second request including the first policy identifier; transmitting, to the first PCF, the second request; receiving, from the first PCF, a second response that includes the first policy identifier; transmitting, to the SMF, the second response; generating a revised second request by replacing the first policy identifier with the second policy identifier in the second request; transmitting, to the second PCF, the revised second request; and receiving, from the second PCF, a third response that includes the second policy identifier.

While the example clauses described above are described with respect to one particular implementation, it should be understood that, in the context of this document, the content of the example clauses can also be implemented via a method, device, system, a computer-readable medium, and/or another implementation.

CONCLUSION

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A system, comprising:
one or more processors; and
a memory storing components executable by the one or more processors to perform operations comprising:
receiving, from a session management function (SMF), a first request for a policy corresponding to a session, the first request comprising a first policy identifier corresponding to a first policy control function (PCF);
determining that the first PCF is unavailable;
generating a modified first request by replacing the first policy identifier with a second policy identifier in the first request, the second policy identifier corresponding to a second PCF;
transmitting, to the second PCF, the modified first request;
receiving, from the SMF, a second request that requests the policy associated with the session;
transmitting, to the first PCF, the second request;
receiving, from the first PCF, a response that comprises the first policy identifier;
forwarding, to the SMF, the response;
transmitting, to the second PCF, the second request; and
receiving, from the second PCF, a second response that comprises the second policy identifier.

2. The system of claim 1, wherein the one or more processors and the memory are comprised in at least one of a service communication proxy (SCP), a building support function (BSF), or an interworking function (IWF).

3. The system of claim 1, wherein the modified first request comprises at least one of an Rx message originating from an Internet Protocol (IP) Multimedia Subsystem (IMS) network, a policy control update message, or a policy control delete message.

4. The system of claim 1, wherein the memory comprises a datastore that comprises:
an entry comprising the first policy identifier, the second policy identifier, and an identifier of the session,
wherein generating the modified first request comprises:
identifying the entry based on the first policy identifier; and
identifying the second policy identifier based on the entry.

5. The system of claim 4, wherein the entry further comprises a subscription permanent identifier (SUPI) and a data network name (DNN) of the session.

6. The system of claim 1, wherein the session comprises a voice over new radio (VONR) session.

7. The system of claim 1, the operations further comprising:
receiving, from the SMF, a third request that requests a change to the policy associated with the session, the third request comprising the first policy identifier;
transmitting, to the first PCF, the third request;
receiving, from the first PCF, a third response that comprises the first policy identifier;
transmitting, to the SMF, the third response;
generating a revised third request by replacing the first policy identifier with the second policy identifier in the third request;
transmitting, to the second PCF, the revised third request; and
receiving, from the second PCF, a fourth response that comprises the second policy identifier.

8. A method, comprising:
receiving, from a session management function (SMF), a first request for a policy corresponding to a session, the first request comprising a first policy identifier corresponding to a first policy control function (PCF);
determining that the first PCF is unavailable;
generating a modified first request by replacing the first policy identifier with a second policy identifier in the first request, the second policy identifier corresponding to a second PCF;

transmitting, to the second PCF, the modified first request;
receiving, from the SMF, a second request that requests a change to the policy associated with the session, the second request comprising the first policy identifier;
transmitting, to the first PCF, the second request;
receiving, from the first PCF, a response that comprises the first policy identifier;
transmitting, to the SMF, the response;
generating a revised second request by replacing the first policy identifier with the second policy identifier in the second request;
transmitting, to the second PCF, the revised second request; and
receiving, from the second PCF, a second response that comprises the second policy identifier.

9. The method of claim 8, wherein the method is performed by at least one of a service communication proxy (SCP), a building support function (BSF), or an interworking function (IWF).

10. The method of claim 8, wherein generating the modified first request comprises:
identifying, in a datastore, an entry comprising the first policy identifier, the second policy identifier, and an identifier of the session; and
identifying the second policy identifier based on the entry.

11. The method of claim 10, wherein the entry further comprises a subscription permanent identifier (SUPI) and a data network name (DNN) of the session.

12. The method of claim 8, wherein the session comprises a voice over new radio (VONR) session.

13. The method of claim 8, further comprising:
receiving, from the second PCF, a third response based on the modified first request, the third response comprising the second policy identifier;
generating a modified third response by replacing the second policy identifier with the first policy identifier in the response; and
transmitting, to the SMF, the modified third response.

14. The method of claim 8, the method further comprising:

receiving, from the SMF, a third request that requests the policy associated with the session;
transmitting, to the first PCF, the third request;
receiving, from the first PCF, a third response that comprises the first policy identifier;
forwarding, to the SMF, the third response;
transmitting, to the second PCF, the third request; and
receiving, from the second PCF, a fourth response that comprises the second policy identifier.

15. A system, comprising:
one or more processors; and
a memory storing components executable by the one or more processors to perform operations comprising:
receiving, from a session management function (SMF), a first SIP request that requests a policy associated with a voice session;
transmitting, to a first policy control function (PCF), the first SIP request;
receiving, from the first PCF, a first SIP response that comprises a first policy identifier corresponding to the policy of the voice session;
forwarding, to the SMF, the first SIP response;
receiving, from the SMF, a second SIP request that comprises the first policy identifier;
determining that a communication link with the first PCF is interrupted;
generating a modified second SIP request by replacing the first policy identifier with a second policy identifier in the second SIP request; and
transmitting, to a second PCF, the modified second SIP request.

16. The system of claim 15, wherein the one or more processors and the memory are comprised in at least one of a service communication proxy (SCP), a building support function (BSF), or an interworking function (IWF).

17. The system of claim 15, wherein the second SIP request comprises at least one of an Rx message originating from an Internet Protocol (IP) Multimedia Subsystem (IMS) network, a policy control update message, or a policy control delete message.

* * * * *